April 4, 1967  V. SYNEK  3,312,511
ROLLING BEARINGS
Filed July 7, 1964
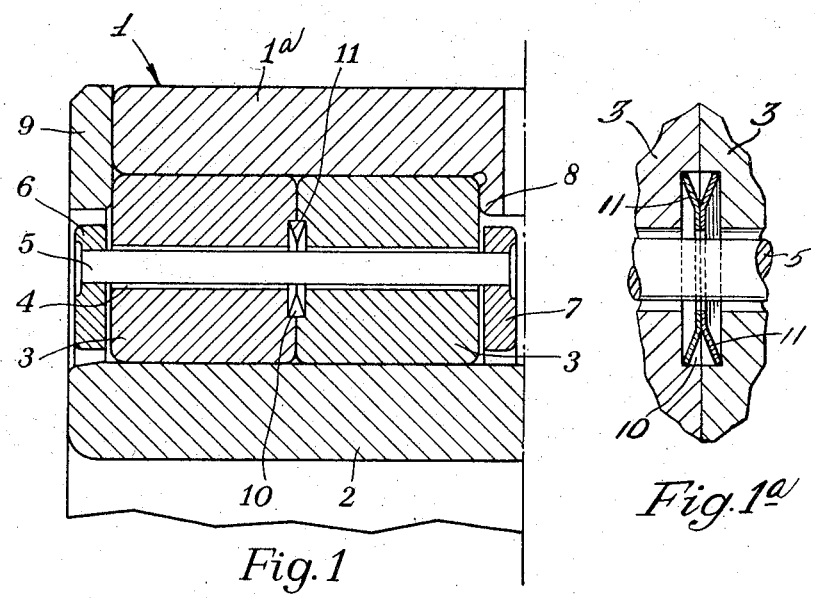
Fig.1
Fig.1ª
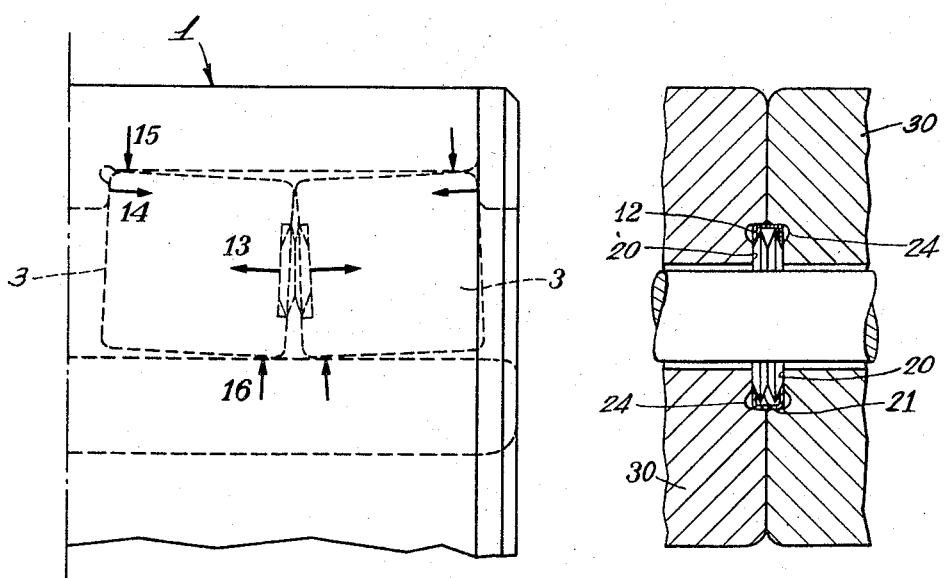
Fig.2
Fig.3
INVENTOR:
VIKTOR SYNEK
BY Howson & Howson
ATTYS.

United States Patent Office 3,312,511
Patented Apr. 4, 1967

3,312,511
ROLLING BEARINGS
Viktor Synek, Goteborg, Sweden, assignor to Aktiebolaget Svenska Kullagerfabriken, Goteborg, Sweden, a corporation of Sweden
Filed July 7, 1964, Ser. No. 380,828
Claims priority, application Sweden, July 30, 1963, 8,374/63
6 Claims. (Cl. 308—213)

The present invention relates to improvements in rolling bearing assemblies.

More particularly the present invention relates to improvements in multi-row cylindrical roller bearing assemblies which typically include guide means for the roller elements. These guide means may include flanges at the outer edges of the bearing rings or separate guide rings which may be detachably mounted or shrunk on the bearing rings. The axial end faces of the rollers engage the guide flanges or guide rings whereby the rollers are guided axially. However, it has been found that especially in the case of large bearings, the rollers tend to slide in the unloaded zone of the bearing. This sliding movement is undesirable and has deleterious effects in bearing mountings in machines where it is desired, for example to reverse the direction of rotation of some of the elements of the machine such as in a reversible rolling mill.

Thus it is an object of the present invention to improve roller guidance and to provide means for eliminating the sliding movement of the rollers in the unloaded zone of a bearing. To this end in accordance with the present invention, there is provided means in the form of a resilient member to urge the axial end faces of the roller against the guide flange or guide ring of the bearing. In accordance with the present invention, the resilient force urging the rollers against the guide flange is so determined relative to the weight of the rollers and the height of the guide flange that the rollers are subjected to tilting forces in a radial plane of such a magnitude that contact between the roller and the roller races is assured even in the unloaded zone of the bearing.

These and other objectives of the present invention and the various features and details of the construction and operation of a bearing in accordance with the present invention are hereinafter more fully set forth and described with references to the accompanying drawing, wherein:

FIG. 1 is a transverse sectional view of a portion of a multi-row cylindrical roller bearing;

FIG. 1a is an enlarged fragmentary sectional view showing the resilient member between adjacent rollers;

FIG. 2 is a schematic view showing the relative position of the rollers in the unloaded zone of a bearing; and FIG. 3 is an enlarged fragmentary sectional view of adjacent rollers of the bearing assembly and the biasing means between the rollers.

Referring now to the drawing and particularly to FIG. 1 thereof, there is shown a portion of a multi-row cylindrical roller bearing assembly 1 in accordance with the present invention. The bearing assembly 1 includes inner and outer rings 2 and 1a respectively which are spaced apart to define an annular space for a plurality of rollers 3. In the present instance the rollers are arranged in two rows in the annular space. The bearing assembly further includes a roller cage comprising a pair of annular rings 6 and 7 disposed at opposite sides of the rows of rollers and a plurality of axially extending pins 5 which engage through bores 4 in the rollers and are connected at opposite ends to the rings 6 and 7 respectively. The rings 6 and 7 have a number of holes corresponding to the number of rollers in each row and the end portions of the pins are inserted in these holes and fixed to the rings 6 and 7 in any suitable manner, for instance by riveting the ends of the pins. In this manner the cage maintains the rollers at predetermined equal distances from each other along their pitch circuit. In the bearing assembly illustrated the outer ring has a fixed annular central flange 8 and a guide ring 9 against which the rollers abut. When loose guide rings are used, these may be suitably fixed in place when the bearing is mounted for instance by pairing two bearings and retaining the guide rings at the outer sides of the bearings by means of other members or elements in the mounting.

In accordance with the present invention, means is provided in the nature of a resilient force acting through the rollers against the guide flange so determined relative to the weight of the rollers and the height of the flange that the rollers are subjected to tilting forces in a radial plane. By this arrangement contact between the rollers and raceways is maintained even in the unloaded zone thereby eliminating the tendency of the rollers to slide. In the present instance this is accomplished by providing spring means between the confronting axial end faces of the rollers in the adjacent rows of rollers.

To this end the confronting axial end faces of the rollers in adjacent rows are provided with recesses 10 to define a cavity between the rollers in which is mounted a resilient member which urges the rollers outwardly relative to one another. The resilient member may be in the form of a disc spring 11 and in the form illustrated in FIG. 1 the resilient member comprises two such disc springs mounted so that their concave faces confront the bottoms of the recesses in the confronting rollers. The outer diameter of the disc springs is preferably substantially equal to that of the recess in the axial end face of the roller whereby the disc spring is guided in said recess. FIG. 2 shows how the disc springs act on the rollers 3 and how the rollers 3 tilt in the unloaded zone around the edges of the flange 8 and guide ring 9. The force exerted on the rollers 3 from the disc springs is designated by the arrow 13 and the arrow 14 indicates the force or reaction from the flange. The arrows 15 and 16 indicate respectively the forces at the points of contact of the rollers with the outer and inner race rings respectively due to the tilting action of the rollers.

There is illustrated in FIG. 3 another form of resilient member or biasing means for a bearing constructed in accordance with the present invention. In this embodiment four disc springs 21 have been interconnected to form a unit, the face of the outermost disc springs engaging the roller ends adjacent the inner edges of the springs. When the number of springs used is such that the greatest diameter of one spring will be located in a plane between the roller ends, the springs may be mounted in a sleeve 12 as shown in FIG. 3 to provide a unit which may be easily handled. In this instance the opening 20 in the axial end faces of the rollers 30 is enlarged as at 24 to accommodate the sleeve 12 and insure contact of the disc springs with the rollers. By combining a suitable number of springs a considerable number of combinations may be obtained, and it is possible in each case to obtain a resilient force suitable for any condition depending on the size of the rollers, the height of the flange, crowning of the roller race, etc. Disc springs have been found to provide considerable advantage as compared with other types of springs, for instance they require little space and further usually have a spring characteristic which increases with the load. The variation in force will therefore be only slight even in cases in which the variations in compression will be relatively great. In order to guide the spring member better in the recess of the roller end it may in certain cases be dimensioned so that there will be a snug fit between its outer edge and the walls of the recess. In this way all risk that the spring member will fall out of the recess during the assembling operation is eliminated.

While particular embodiments of the present invention have been illustrated and described herein, it is not intended to limit the invention and changes and modifications may be made therein within the scope of the following claims.

I claim:

1. A cylindrical roller bearing assembly comprising inner and outer rings having confronting raceways which are spaced apart, a plurality of rollers in the annular space between the raceways arranged in at least two rows of rollers, a guide flange confronting outer axial end faces of the rollers in each of said rows, biasing means comprising at least one disc spring disposed between inner axial end faces of the confronting rollers in adjacent rows providing a resilient force to urge the rollers away from one another and against the guide flanges thereby to subject the rollers to a tilting force in a radial plane of a magnitude to maintain the rollers in contact with the raceways to prevent sliding of the rollers in the unloaded zone of the bearing.

2. A roller bearing assembly as claimed in claim 1 including means defining a recess in the axial end face of the confronting rollers in adjacent rows and at least one disc spring mounted between said rollers in said cavity defined by said recesses.

3. A roller bearing assembly as claimed in claim 2 wherein the disc spring is disposed within a sleeve.

4. A roller bearing assembly as claimed in claim 2 wherein the outer diameter of the disc spring is substantially equal to that of the recess in order to guide the disc spring in the recess.

5. A roller bearing assembly comprising inner and outer rings having confronting raceways which are spaced apart, a plurality of rollers in the annular space between the raceways arranged in at least two rows of rollers, a guide flange confronting outer axial end faces of the rollers in each of said rows, means defining a recess in the axial end face of the confronting rollers in adjacent rows and at least one disc spring mounted between said rollers in the cavity defined by said recesses, said disc spring engaging the axial end surfaces of the rollers at their inner edges and providing a resilient force to urge the rollers away from one another and against the guide flanges thereby to subject the rollers to a tilting force in a radial plane of a magnitude to maintain the rollers in contact with the raceways to prevent sliding of the rollers in the unloaded zone of the bearing.

6. A roller bearing assembly as claimed in claim 1 wherein said biasing means comprises a double tapered disc spring member.

References Cited by the Examiner

FOREIGN PATENTS 561,562 10/1923 France.
292,730 1/1932 Italy.
399,924 11/1942 Italy.

FRANK SUSKO, *Examiner.*

MARTIN P. SCHWADRON, *Primary Examiner.*